April 8, 1947.  G. L. DIMMICK  2,418,627
COLOR SELECTIVE PRISM
Filed Sept. 30, 1943
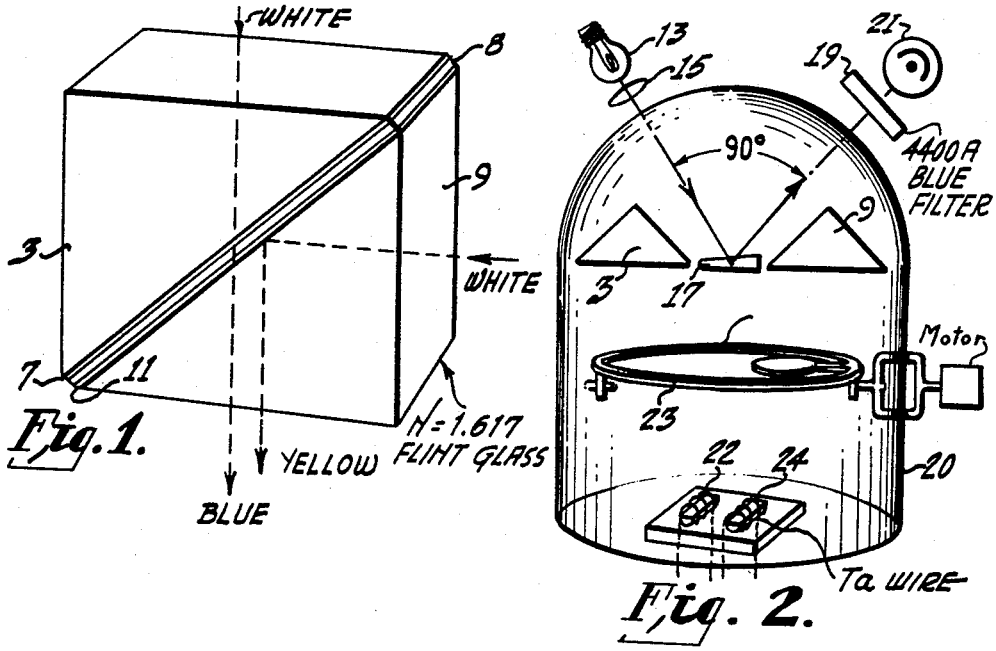
Fig. 1.
Fig. 2.
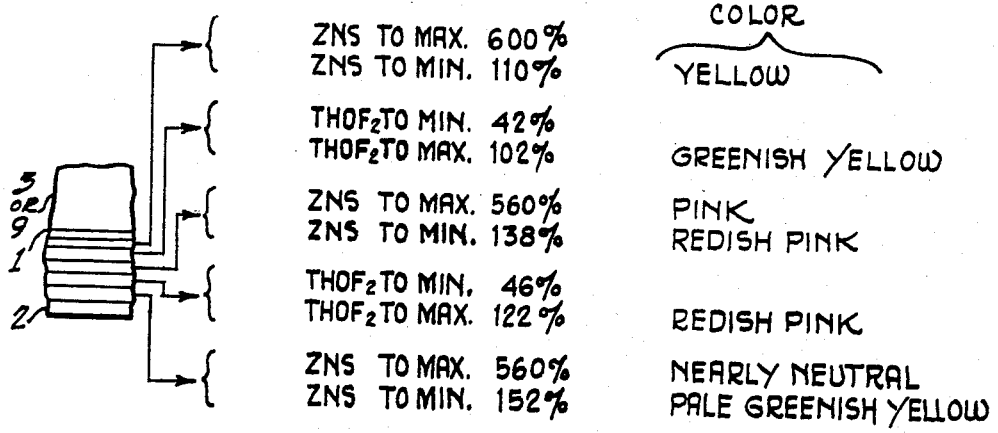
Fig. 3.
Witness:
F. J. Harbaugh
Inventor
Glenn L. Dimmick
By Cel Ruska
Attorney Patented Apr. 8, 1947

2,418,627

UNITED STATES PATENT OFFICE 2,418,627

COLOR SELECTIVE PRISM

Glenn L. Dimmick, Indianapolis, Ind., assignor to Radio Corporation of America, a corporation of Delaware Application September 30, 1943, Serial No. 504,365

10 Claims. (Cl. 88—1)

This invention relates to color selective prisms and more particularly to an improvement in optical cubes characterized by light transmission of one color and light reflection of a different color, and has particular utility, for example, in color photography.

One object of my invention is to provide a color selective optical device characterized by richer and deeper color effects than heretofore obtainable.

Another object of the invention is to provide an optical cube that is characterized by light transmission of one color, for example blue, and light reflection of a different color, for example yellow, with improved efficiency and low absorption.

Still another object of the invention is to provide a color selective device, for use in color photography, having a substantially wide angle of view with a minimum of change in color throughout the angle.

Other incidental objects of my invention will be apparent to those skilled in the art from a reading of the following specification and an inspection of the accompanying drawing in which, Figure 1 is an enlarged end view of an optical cube made from a pair of prisms in accordance with my invention, Figure 2 is a diagrammatic sketch, in side elevation illustrating some apparatus employed in controlling the thickness of the various layers during the evaporation process in a vacuum device, and Figure 3 is a greatly enlarged end view of a portion of one prism constituting the optical cube of Fig. 1, together with a table showing the arrangement and nature of the coating layers on surfaces of the prisms.

In my application, Serial No. 490,021, filed June 8, 1943, I have disclosed and claimed an optical neutral cube wherein a pair of prisms are cemented together with their hypotenuse surfaces adjacent, said surfaces having thereon thin selective reflecting films of such nature that the film on one hypotenuse surface has a color characteristic that is complementary in nature to that of the film on the other hypotenuse surface, resulting in a combination in the optical cube that transmits substantially half of the light and reflects half without appreciable color effect and without substantial light absorption.

In accordance with the present invention, the adjacent hypotenuse surfaces of the prisms that constitute the cube, are likewise coated with thin films and the prisms cemented together in parallel spaced relation. However, the coatings are preferably similar in nature and the resultant combination is characterized by the fact that white light appears blue by transmission and yellow by reflection. Heretofore, color selective optical cubes have been made with only one hypotenuse surface of one of the prisms being coated with a color selective film. By coating the hypotenuse surface of each of the prisms, greatly improved results are obtained in accordance with the invention, resulting particularly in deeper color effects. One difficulty that has been solved in the making of the present device is that the thickness of the coatings for the desired color as determined in air is quite different when the sections, or prisms, of the cube are cemented together.

Referring to Fig. 1, an optical prism 3 of flint glass has deposited upon its hypotenuse surface area a multi-layer coating or film 7 that is shown in detail in Fig. 3. Another prism 9, similar in shape and characteristics to prism 3, has deposited upon its hypotenuse surface a multi-layer coating 11, similar to 7 and also shown in Fig. 3. After the prisms 3 and 9 have been coated in the apparatus shown in Fig. 2, in the same manner as disclosed in the above mentioned application Serial No. 490,021, and after baking in an oven several hours, the prisms are cemented together by means of Canadian balsam 8 or other suitable transparent material, taking care that the adjacent surfaces are quite parallel when the cement dries or sets. Other spacing means may be used, but the balsam is preferred in that it has the desired optical properties, is neutral in color in a thin layer, and is a good cement. If the surfaces are not parallel, or if the spacing is too great, double images may be seen through the prism. By way of example, a pair of prisms, coated in accordance with the invention, were baked for about twelve hours at 160° C. and were then cemented together and spaced a minimum distance of about ten wavelengths of light of the transmitted color, e. g. green light, the color used in this case. With such a spacing, white light incident upon the prisms appears blue by transmission and yellow by reflection.

It is desirable that the coatings or films 7 and 11 on the adjacent prism surfaces be hard and durable, otherwise small particles of dust may rupture the films during the cementing process. A protective layer 2, as well as an initial layer 1, of thorium oxy-fluoride on each color selective film as indicated in Fig. 3, and of the nature disclosed in another co-pending application, Serial No. 464,018, filed October 31, 1942, results in a hard and durable surface. Satisfactory results have been obtained without layers 1 and 2 by improved technique.

Referring to Fig. 3, a coating 1 of thorium oxyfluoride may be applied to the hypotenuse surface of each prism for the purpose of sealing the surface against water absorption and also to provide improved adhesion of the next coat to the prism as disclosed and claimed in my application Serial No. 464,018. On the transparent support body of optical flint glass prisms 3 and 9, there is deposited by thermal evaporation from evaporating boats 22 and 24, successively heated, alternate layers of thorium oxyfluoride and zinc sulfide starting and ending with the former as above mentioned. Boat 22, for the $ThOF_2$, is preferably of platinum or molybdenum, while boat 24 is preferably of Alundum, disposed within a heating coil of tantalum wire. The thickness of each layer, particularly the zinc sulfide layers, is determined by means of the optical test wedge 17, light source 13, condensing lens 15, filter 19 and photocell-electron multiplier 21 in the manner shown and claimed in my application, Serial No. 372,811, filed January 2, 1941 and issued as Patent 2,338,234, January 4, 1944. While the last zinc sulfide coating is listed in Fig. 3 as pale greenish yellow in color, it is noted that this is the reflected color in air, resulting in a yellow color by reflection after the prisms are cemented together.

While I have referred to the first, last and certain intermediate layers as thorium oxy-fluoride, it will be understood that they may be of thorium fluoride, it being difficult to determine the exact nature of the compound for reasons disclosed in my above mentioned application, Serial No. 464,018, and I prefer to refer to the material as a compound of thorium and fluorine. The thorium compound coating has an index of refraction of approximately 1.52 after baking, nearly that of the glass support base, while zinc sulfide has a substantially higher index of refraction of about 2.2. The thickness of each layer is indicated in the table of Fig. 3 in relation to the maximum and minimum percent of the reflection using a 4400A blue filter and a control angle of about 45°, as shown in Fig. 2. The table shows the optical thicknesses and the percent reflections from the various layers composing the film coating. The layers are so related and of such thickness that the final result in combination with the prisms cemented together, as above described, will be that ordinary white light will appear blue by transmission and yellow by reflection, as indicated in Fig. 1. After assembly of the prisms to form the cube, the device is preferably baked at about 50° C. for one hour or more.

In some cases it is desirable to make the coating on one prism surface of a different color, for example by making certain of the layers thicker than on the other prism in order to broaden the color spectrum. In terms of the characteristics as shown by a curve, the optical curve for each coating would peak at a different point in the color spectrum. This permits covering a greater angle with less change in color and is highly desirable in a color camera. In color photography it is desirable to obtain the same color throughout a wide angle of viewing, and by making the coatings different in thickness and therefore different in color characteristics, or in other words by a staggering effect, this desirable result in photography is realized.

Having thus described the invention with considerable detail and with respect to certain broad forms of the invention, the foregoing disclosure is to be regarded as descriptive and illustrative only and not as restrictive or limitative of the invention, and I do not desire to be limited to such details since many changes and modifications may well be made without departing from the spirit and scope of the invention in its broadest aspect.

While I have disclosed the spaced optical coatings as being applied to adjacent surfaces of two prisms, respectively, these coatings have successfully been applied by me upon the surface of only one of the prisms forming the optical cube. In such case the spacing material for separating the coatings was Canada balsam, the thickness of which is not critical. While the spacing between coatings can be increased substantially more than ten wavelengths of light without difficulty, trouble results if the spacing be decreased. As the films or coatings are placed together a distance less than this specified amount, or thereabouts, they begin to show bad interference fringes, and if the spacing were decreased to the order of one wavelength these fringes would ruin the effectiveness of the reflector. When the spacing is, however, ten wavelengths or more the fringes for the various colors blend in together to form a uniformly reflecting surface on which the eye is unable to detect interference fringes. If the separation layer were too thick then it is obvious that there would be double images formed by the individual surfaces, but this situation is not serious and it does not appear necessary to specify an upper limit for the separation because it would depend upon the particular application for which the device is used.

An important characteristic of the color selective coatings or film as described above is that they have practically no light absorption, thus distinguishing them from other types of metalized or dye films which conceivably might be employed.

While I have disclosed above the use of initial and final layers 1 and 2 of thorium oxy-fluoride, satisfactory results have been obtained without these. A technique has been worked out by which the prisms can be cemented together without scratching the individual layers even though the final layer is zinc sulfide. Although the first layer of the thorium compound would make the films less soluble in water, this requirement is not necessary when the films are cemented between glass elements, as in this case.

I claim as my invention:

1. A color selective optical device for transmitting light of one color and reflecting light of a different color, comprising a pair of prisms having their hypotenuse surfaces adjacent and parallel, a plurality of thin transparent selectively reflecting coatings disposed upon each of said surfaces, said coatings each comprising alternate layers of zinc sulphide and thorium oxy-fluoride having a thickness measured in terms of fractional wavelengths of the transmitted light, said layers of zinc sulphide having an index of refraction substantially higher than that of said prisms, and a layer of transparent optical cement separating said coated surfaces a distance within the range of several wavelengths of light as determined by maximum and minimum conditions such that objectionable double images occur beyond the maximum condition and color fringes occur below the minimum condition, said device being characterized by richness of color and negligible absorption of light.

2. In a light selective device for transmitting light of one color and reflecting light of a different color with negligible absorption and with rich color effects, a light transmitting optical solid body having adjacent superposed surfaces, a plurality of selectively reflecting transparent coatings on each of said surfaces, each of said coatings comprising a layer of thorium oxyfluoride and a superposed layer of material having a substantially higher index of refraction than that of said optical solid body, said layers each having a thickness measured in terms of fractional wavelengths of the transmitted light and a layer of transparent optical cement separating said coated surfaces a distance within a range of several wavelengths of light as determined by maximum and minimum conditions such that objectionable double images occur beyond the maximum condition and color fringes occur below the minimum condition.

3. In a color selective optical device for transmitting light of one color and reflecting light of a different color with negligible absorption and a high degree of color saturation, a light transmitting solid element having adjacent spaced parallel optical surfaces, a plurality of selectively reflecting transparent coatings on each of said surfaces, said coatings each comprising a layer of low index of refraction material compared to the index of refraction of said solid element and a superposed layer of zinc sulphide, having an index of refraction substantially higher than that of said solid element, said layers each having a thickness measured in terms of fractional wavelengths of the transmitted light, the distance separating said coatings lying between and being determined by minimum and maximum conditions such that for the minimum distance color fringes, objectionable below said minimum, blend to form a uniform reflecting surface with color fringes undetectable to the eye, while for the maximum distance no double images are apparent to the eye.

4. An article according to claim 3 in which said optical device comprises a cube for transmitting blue light and reflecting yellow light and wherein said spaced parallel optical surfaces comprise the hypotenuse surfaces of a pair of prisms which have been placed with said hypotenuse surfaces adjacent in order to form said cube.

5. In a color selective optical device for high transmission of light of one color and high reflection of light of a different color, a light transmitting solid support body having a pair of adjacent spaced optical surfaces disposed in parallel relation, a plurality of color selective transparent coatings disposed upon each of said surfaces, each of said coatings comprising alternate layers of material having a relatively high and a relatively low index of refraction compared to that of said support, the thicknesses of each of said layers being of the order of fractional wavelengths of the transmitted light and said thicknesses also being such as to secure a predetermined color selectivity, the distance separation between said coatings lying between and being determined by minimum and maximum conditions such that for the minimum distance color fringes blend to form a uniform reflecting surface and for the maximum condition no double images are apparent to the eye.

6. A device according to claim 5 in which the coating thicknesses on each adjacent optical surface are different whereby said coatings have somewhat different color characteristics for covering a greater angle with less change in color.

7. An article according to claim 3 in which said low index layers comprise thorium oxyfluoride and said high index layers comprise zinc sulphide and wherein said parallel coated surfaces are joined by a layer of Canadian balsam, the index of refraction of said solid elements being of the order of 1.62.

8. The method of making a light divider including a pair of solid transparent components each of which has at least one optically plane surface, which method comprises thermally depositing in vacuo on each of said surfaces a plurality of thin selectively reflecting transparent coatings, each of said coatings comprising alternate layers of a material having a relatively low and a relatively high index of refraction compared to that of said solid transparent components, controlling the deposition of said coatings with regard to their optical thicknesses and indices of refraction that white light will appear as one color by transmission and a different color by reflection with the divider completed, the thicknesses of each of said layers also being characterized as of fractional wavelengths of the transmitted light, and securing said coated surfaces facing each other in spaced parallel relation, the distance of separation being within a range such that for the minimum condition color fringes blend to form a uniform reflecting surface with color fringes undetectable to the eye and for the maximum condition substantially no double images appear.

9. A method according to claim 8 in which said low index material is thorium oxyfluoride and said high index material is zinc sulfide.

10. A method according to claim 8 in which said coated surfaces are cemented together with Canada balsam.

GLENN L. DIMMICK.

REFERENCES CITED

The following references are of record in the file of this patent:

UNITED STATES PATENTS

| Number    | Name            | Date           |
|-----------|-----------------|----------------|
| 2,189,933 | Ball et al.     | Feb. 13, 1940  |
| 1,661,611 | Hamburger et al.| Mar. 6, 1928   |
| 1,989,317 | Harper          | Jan. 29, 1935  |
| 2,281,474 | Cartwright et al.| Apr. 28, 1942 |
| 1,176,313 | Pfund           | Mar. 21, 1916  |
| 1,222,049 | Tillyer         | Apr. 10, 1917  |
| 2,106,752 | Land            | Feb. 1, 1938   |
| 2,189,298 | Rantsch         | Feb. 6, 1940   |
| 2,239,452 | Williams et al. | Apr. 22, 1941  |
| 2,289,054 | Dimmick         | July 7, 1942   |
| 2,349,457 | Osterberg       | May 23, 1944   |
| 2,345,777 | Somers          | Apr. 4, 1944   |
| 2,220,861 | Blodgett        | Nov. 5, 1940   |
| 2,338,234 | Dimmick         | Jan. 4, 1944   |

OTHER REFERENCES

Cartwright et al., Ph. Review, vol. 55, June 1, 1939, p. 1128. (Typed copy of article in 88–1R&R.)

Dimmick, Journal Soc. Mot. Picture Engineers, vol. XXXVIII, Jan. 1942, pp. 39–44. (Photostatic copy of said pages in 88–1R&R.)